(12) United States Patent
Hudson et al.

(10) Patent No.: US 10,480,331 B2
(45) Date of Patent: Nov. 19, 2019

(54) AIRFOIL HAVING PANEL WITH GEOMETRICALLY SEGMENTED COATING

(71) Applicant: United Technologies Corporation, Farmington, CT (US)

(72) Inventors: Eric A. Hudson, Harwinton, CT (US); Raymond Surace, Newington, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 331 days.

(21) Appl. No.: 15/354,260

(22) Filed: Nov. 17, 2016

(65) Prior Publication Data

US 2018/0135438 A1    May 17, 2018

(51) Int. Cl.
*F01D 5/28* (2006.01)
*F01D 5/18* (2006.01)
(Continued)

(52) U.S. Cl.
CPC .............. *F01D 5/284* (2013.01); *F01D 5/147* (2013.01); *F01D 5/187* (2013.01); *F01D 5/188* (2013.01); *F01D 5/282* (2013.01); *F01D 5/288* (2013.01); *F01D 9/041* (2013.01); *F01D 25/005* (2013.01); *F01D 25/12* (2013.01); *F02C 3/04* (2013.01); *F04D 29/023* (2013.01); *F04D 29/388* (2013.01); *F04D 29/542* (2013.01); *F05D 2220/32* (2013.01); *F05D 2230/90* (2013.01); *F05D 2240/12* (2013.01); *F05D 2240/35* (2013.01); *F05D 2250/283* (2013.01);
(Continued)

(58) Field of Classification Search
CPC .......... F01D 5/284; F01D 5/188; F01D 5/282; F01D 5/288; F01D 5/147; F01D 25/005; F01D 25/12; F01D 9/041; F01D 5/187; F02C 3/04; F04D 29/542; F04D 29/388; F04D 29/023; F05D 2250/283; F05D 2240/12; F05D 2230/90
See application file for complete search history.

(56) References Cited

U.S. PATENT DOCUMENTS

| 3,215,511 A | 11/1965 | Chisholm |
| 4,137,008 A | 1/1979 | Grant et al. |

(Continued)

FOREIGN PATENT DOCUMENTS

| EP | 0764764 | 3/1997 |
| EP | 1764481 | 3/2007 |

(Continued)

OTHER PUBLICATIONS

U.S. Appl. No. 13/429,474, filed Mar. 26, 2012.
(Continued)

*Primary Examiner* — Jacob M Amick
*Assistant Examiner* — Charles Brauch
(74) *Attorney, Agent, or Firm* — Carlson, Gaskey & Olds, P.C.

(57) ABSTRACT

An airfoil includes an airfoil section that defines an airfoil profile. The airfoil section includes a distinct panel that forms a portion of the airfoil profile. The panel has a geometrically segmented coating section. The geometrically segmented coating section includes a wall that has an outer side. The outer side includes an array of cells, and there is a coating disposed in the array of cells.

21 Claims, 3 Drawing Sheets

(51) Int. Cl.
*F01D 9/04* (2006.01)
*F01D 25/12* (2006.01)
*F01D 25/00* (2006.01)
*F04D 29/02* (2006.01)
*F04D 29/38* (2006.01)
*F04D 29/54* (2006.01)
*F02C 3/04* (2006.01)
*F01D 5/14* (2006.01)

(52) U.S. Cl.
CPC .................. *F05D 2260/202* (2013.01); *F05D 2300/6033* (2013.01); *Y02T 50/672* (2013.01); *Y02T 50/676* (2013.01)

(56) References Cited

U.S. PATENT DOCUMENTS

| | | | |
|---|---|---|---|
| 4,247,259 A | 1/1981 | Saboe et al. | |
| 4,396,349 A | 8/1983 | Hueber | |
| 4,914,794 A | 4/1990 | Strangman | |
| 5,358,379 A | 10/1994 | Pepperman et al. | |
| 5,538,380 A | 7/1996 | Norton et al. | |
| 5,681,616 A | 10/1997 | Gupta et al. | |
| 5,705,231 A | 1/1998 | Nissley et al. | |
| 5,951,892 A | 9/1999 | Wolfla et al. | |
| 6,000,906 A | 12/1999 | Draskovich | |
| 6,102,656 A | 8/2000 | Nissley et al. | |
| 6,224,963 B1 | 5/2001 | Strangman | |
| 6,316,078 B1 | 11/2001 | Smialek | |
| 6,322,322 B1 | 11/2001 | Rhodes et al. | |
| 6,451,416 B1 * | 9/2002 | Holowczak ............. B32B 18/00 264/125 | |
| 6,503,574 B1 | 1/2003 | Skelly et al. | |
| 6,514,046 B1 | 2/2003 | Morrison et al. | |
| 6,543,996 B2 | 4/2003 | Koschier | |
| 6,703,137 B2 | 3/2004 | Subramanian | |
| 6,709,230 B2 | 3/2004 | Morrison et al. | |
| 6,846,574 B2 | 1/2005 | Subramanian | |
| 7,104,756 B2 | 9/2006 | Harding et al. | |
| 7,316,539 B2 | 1/2008 | Campbell | |
| 7,326,030 B2 | 2/2008 | Albrecht et al. | |
| 7,435,058 B2 | 10/2008 | Campbell et al. | |
| 7,452,182 B2 | 11/2008 | Vance et al. | |
| 7,520,725 B1 | 4/2009 | Liang | |
| 7,527,474 B1 * | 5/2009 | Liang ..................... F01D 5/186 416/1 |
| 7,670,116 B1 | 3/2010 | Wilson, Jr. et al. | |
| 7,963,745 B1 | 6/2011 | Liang | |
| 8,079,806 B2 | 12/2011 | Tholen et al. | |
| 8,182,208 B2 | 5/2012 | Bridges, Jr. et al. | |
| 8,197,211 B1 | 6/2012 | Liang | |
| 8,202,043 B2 | 6/2012 | McCaffrey | |
| 8,251,651 B2 | 8/2012 | Propheter-Hinckley et al. | |
| 8,366,392 B1 | 2/2013 | Laing | |
| 8,480,366 B2 | 7/2013 | Malecki et al. | |
| 8,506,243 B2 | 8/2013 | Strock et al. | |
| 8,821,124 B2 | 9/2014 | Viens et al. | |
| 2002/0172799 A1 | 11/2002 | Subramanian | |
| 2008/0159850 A1 | 7/2008 | Tholen et al. | |
| 2010/0074726 A1 | 3/2010 | Merrill et al. | |
| 2010/0136258 A1 | 6/2010 | Strock et al. | |
| 2011/0110771 A1 | 5/2011 | Morgan et al. | |
| 2014/0169943 A1 * | 6/2014 | Bunker ................... C23C 4/02 415/116 |
| 2016/0090851 A1 | 3/2016 | Carr et al. | |

FOREIGN PATENT DOCUMENTS

| | | |
|---|---|---|
| EP | 2105579 | 9/2009 |
| EP | 2853688 | 4/2015 |
| GB | 2272453 | 5/1994 |
| JP | 61066802 | 4/1986 |
| JP | 05321602 | 12/1993 |

OTHER PUBLICATIONS

U.S. Appl. No. 14/659,718, filed Mar. 17, 2015.
U.S. Appl. No. 14/812,668, filed Jul. 29, 2015.
European Search Report for European Patent Application No. 17202286 completed Mar. 12, 2018.

* cited by examiner

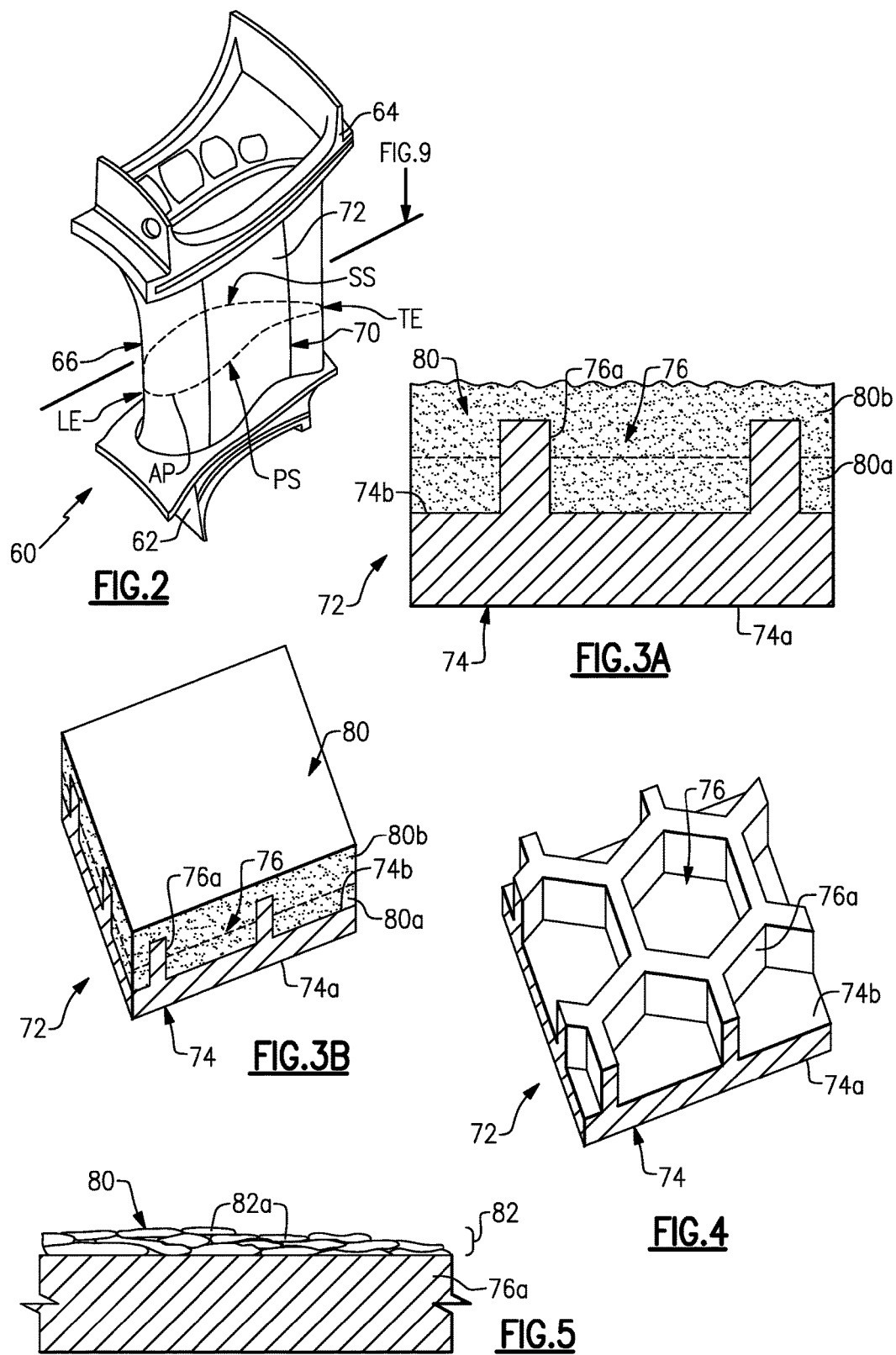

US 10,480,331 B2

AIRFOIL HAVING PANEL WITH GEOMETRICALLY SEGMENTED COATING

BACKGROUND

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

The high pressure turbine drives the high pressure compressor through an outer shaft to form a high spool, and the low pressure turbine drives the low pressure compressor through an inner shaft to form a low spool. The fan section may also be driven by the low inner shaft. A direct drive gas turbine engine includes a fan section driven by the low spool such that the low pressure compressor, low pressure turbine and fan section rotate at a common speed in a common direction.

A speed reduction device, such as an epicyclical gear assembly, may be utilized to drive the fan section such that the fan section may rotate at a speed different than the turbine section. In such engine architectures, a shaft driven by one of the turbine sections provides an input to the epicyclical gear assembly that drives the fan section at a reduced speed.

SUMMARY

An airfoil according to an example of the present disclosure includes an airfoil section that defines an airfoil profile. The airfoil section has a distinct panel that forms a portion of the airfoil profile. The distinct panel has a geometrically segmented coating section. The geometrically segmented coating section has a wall that has an outer side. The outer side has an array of cells, and a coating is disposed in the array of cells.

In a further embodiment of any of the foregoing embodiments, the distinct panel is attached with a core skeleton.

In a further embodiment of any of the foregoing embodiments, the panel is integral with the core skeleton.

In a further embodiment of any of the foregoing embodiments, the core skeleton is metal.

A further embodiment of any of the foregoing embodiments includes compliment panel attached with the core skeleton and defining a different portion of the airfoil profile.

In a further embodiment of any of the foregoing embodiments, the compliment panel includes a non-segmented coating section.

In a further embodiment of any of the foregoing embodiments, the distinct panel and the compliment panel define a cooling hole there between.

In a further embodiment of any of the foregoing embodiments, the compliment panel is ceramic.

In a further embodiment of any of the foregoing embodiments, the ceramic is selected from the group consisting of a monolithic ceramic and a ceramic matrix composite.

A further embodiment of any of the foregoing embodiments includes spacers that offset the panel from the core skeleton such that there is a passage between the panel and the core skeleton.

In a further embodiment of any of the foregoing embodiments, the spacers are projections on the core skeleton.

In a further embodiment of any of the foregoing embodiments, the core skeleton includes an internal passage and a plurality of cooling holes with inlets that open to the internal passage and outlets adjacent the distinct panel.

In a further embodiment of any of the foregoing embodiments, the core skeleton includes a baffle in the internal passage.

In a further embodiment of any of the foregoing embodiments, the core skeleton includes an exterior wall portion that forms a portion of the airfoil profile.

In a further embodiment of any of the foregoing embodiments, the core skeleton includes a recess in which the distinct panel is disposed such that the distinct panel is flush with the exterior wall portion.

A gas turbine engine according to an example of the present disclosure includes a compressor section, a combustor in fluid communication with the compressor section, and a turbine section in fluid communication with the combustor. One of the turbine section or the compressor section has an airfoil that has an airfoil section that defines an airfoil profile. The airfoil section has a distinct panel that forms a portion of the airfoil profile. The distinct panel has a geometrically segmented coating section. The geometrically segmented coating section includes a wall that has an outer side. The outer side includes an array of cells, and a coating disposed in the array of cells.

In a further embodiment of any of the foregoing embodiments, the distinct panel is attached with a core skeleton of metal.

A further embodiment of any of the foregoing embodiments includes a compliment panel attached with the core skeleton and defining a different portion of the airfoil profile. The compliment panel includes a non-segmented coating section.

An article according to an example of the present disclosure includes a distinct panel that has a geometrically segmented coating section. The geometrically segmented coating section includes a wall having an array of cells, and a coating is disposed in the array of cells.

In a further embodiment of any of the foregoing embodiments, the distinct panel defines a portion of an airfoil profile, the wall is metal, and the coating is ceramic.

BRIEF DESCRIPTION OF THE DRAWINGS

The various features and advantages of the present disclosure will become apparent to those skilled in the art from the following detailed description. The drawings that accompany the detailed description can be briefly described as follows.

FIG. 2 illustrates an example airfoil in the gas turbine engine.

FIG. 3A illustrates a sectioned view through a panel of the airfoil of FIG. 2, with a geometrically segmented coating.

FIG. 3B illustrates a perspective view of the geometrically segmented coating of FIG. 3A.

FIG. 4 illustrates a wall of the segmented coating, without the coating.

FIG. 5 illustrates a laminar microstructure of a coating.

DETAILED DESCRIPTION

Figure 1:
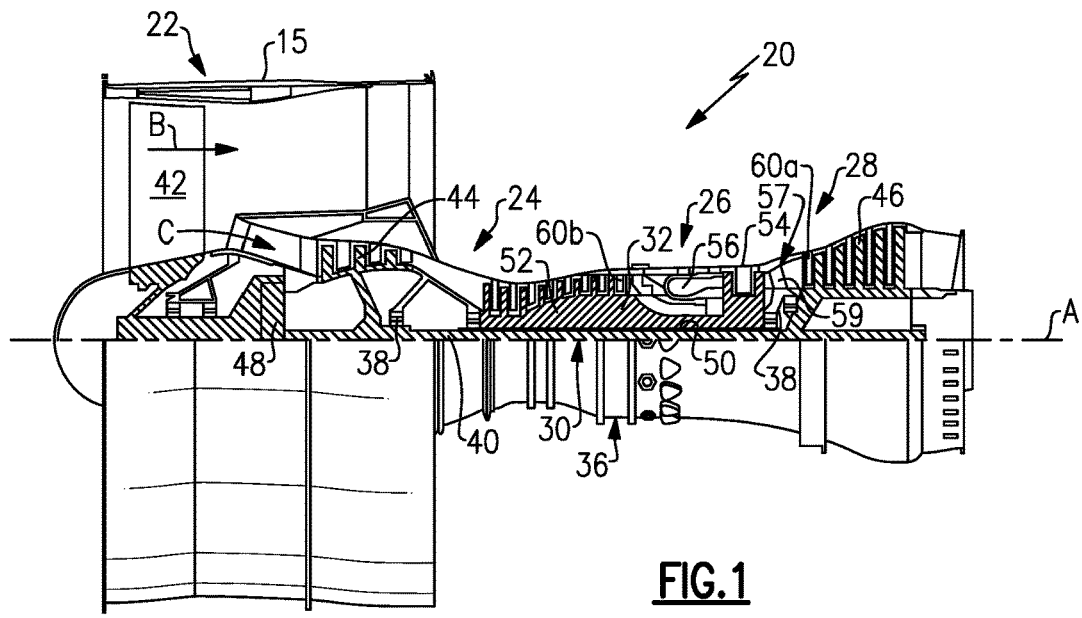
FIG. 1 illustrates an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engine designs can include an augmentor section (not shown) among other systems or features.

The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, the examples herein are not limited to use with two-spool turbofans and may be applied to other types of turbomachinery, including direct drive engine architectures, three-spool engine architectures, and ground-based turbines.

The engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 may be connected to the fan 42 through a speed change mechanism, which in exemplary gas turbine engine 20 is illustrated as a geared architecture 48, to drive the fan 42 at a lower speed than the low speed spool 30.

The high speed spool 32 includes an outer shaft 50 that interconnects a second (or high) pressure compressor 52 and a second (or high) pressure turbine 54. A combustor 56 is arranged between the high pressure compressor 52 and the high pressure turbine 54. A mid-turbine frame 57 of the engine static structure 36, if included, is arranged generally between the high pressure turbine 54 and the low pressure turbine 46. The mid-turbine frame 57 further supports the bearing systems 38 in the turbine section 28. The inner shaft 40 and the outer shaft 50 are concentric and rotate via bearing systems 38 about the engine central longitudinal axis A, which is collinear with their longitudinal axes.

The core airflow is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines, including direct drive turbofans and gas turbines with multiple bypass streams.

A significant amount of thrust is provided by the bypass flow B due to the high bypass ratio. The fan section 22 of the engine 20 may be designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(\text{Tram }° R)/(518.7° R)]^{0.5}$. The "Low corrected fan tip speed" as disclosed herein according to one non-limiting embodiment is less than about 1150 ft/second.

In gas turbine engines air is often bled from the compressor for cooling components in the turbine that cannot withstand stoichiometric ideal temperatures of fuel burn; however, compressor bleed penalizes engine efficiency. Efficiency is governed by thermodynamics and mass flow through the turbine. Efficiency can generally be increased by lowering volume of compressor bleed, increasing velocity of compressor bleed, or increasing temperature of compressor bleed. These goals are challenging to meet because compressor bleed relies on the pressure differential between the compressor and the turbine. That is, the goals of lower volume, increased velocity, and increased temperature of compressor bleed are generally opposite to the goals of high pressure and low temperature compressor bleed desired for achieving good pressure differential. In this regard, to facilitate overcoming such challenges, an approach taken in this disclosure is to reduce the need for compressor bleed and cooling by enhancing the temperature resistance capability of the turbine or other components exposed to high temperatures. In particular, thermal resistance can be enhanced at the compressor exit and turbine inlet.

FIG. 2 illustrates one such component, namely an airfoil 60. For instance, the airfoil 60 can be a turbine vane, as represented at 60a in FIG. 1, or a compressor vane, as represented at 60b in FIG. 1. As will be appreciated, although the examples herein are described in the context of a vane, this disclosure is not limited to vanes, and the examples may also be applicable to blades or other airfoils that are exposed to high temperatures.

The airfoil 60 includes inner and outer platforms 62/64 and an airfoil section 66 that extends radially between the inner and outer platforms 62/64. The airfoil section 66 may be hollow and can include one or more internal passages. A passage can include a cavity, a channel, or the like.

The airfoil section 66 defines an airfoil profile, AP, which is the peripheral shape of the airfoil section 66 when viewed in a radial direction. For example, the airfoil profile has a wing-like shape that provides a reaction force via Bernoulli's principle with regard to flow over the airfoil section 66. The airfoil profile AP generally includes a leading end (LE), a trailing end (TE), a pressure side (PS), and a suction side (SS). For example, the leading end (LE) is the region of the airfoil profile (AP) that includes a leading edge of the airfoil profile (AP), and the trailing end (TE) is the region of the airfoil profile that includes a trailing edge. The leading edge may be the portion of the airfoil profile (AP) that first contacts air or the foremost edge of the airfoil profile (AP). The trailing edge may be the portion of the airfoil profile (AP) that last contacts air or the aftmost edge of the airfoil profile (AP). For a variable vane, the leading edge may shift, depending on the orientation of the vane. The airfoil section 66 includes a distinct panel 70, or a plurality of panels that form a portion of the airfoil profile AP.

To enhance the temperature resistance capability of the component 60, the panel, or panels, 70 includes a geometric segmented coating section 72, which is shown in a cutaway view in FIG. 2 but is also shown in a sectioned view in FIG. 3A and in a perspective view in FIG. 3B. The coating section 72 includes a wall 74. The wall 74 includes a first or inner side 74a and a second or exterior side 74b that is opposite the first side 74a. The second side 74b includes an array of cells 76 defined by cell sidewalls 76a. The array is a repeating geometric pattern of one or more cell geometries. In this example, the cell sidewalls 76a have a uniform thickness. As shown in the isolated view of the wall 74 in FIG. 4, the cells 76 are hexagonal. Alternatively, the cells 76 may be circular, ovular, other polygonal geometry, or mixed cell geometries. The cells may have been machined or cast directly into the wall 74 (as a substrate), or machined into a metallic bond coating applied to the wall exterior side 74b. In the case where the cells are machined or cast directly into the wall 74 (as a substrate), a metallic bond coating may be applied.

A ceramic based thermal barrier coating 80 is disposed in the array of cells 76 to protect the panel 70 from exposure in the core gas path. The cells 76 mechanically segment the coating. This segmentation induces stress relief cracks in the ceramic coating making it tolerant to sintering. The cells 76 thus provide good spallation resistance of the coating 80, particularly at higher temperature locations. In turn, greater spallation resistance may reduce the need for bleed air for cooling or enable use of higher temperature bleed air that is less of an efficiency penalty. The coating 80 is a barrier coating, such as a thermal barrier or environmental barrier, which is formed of a ceramic material. A ceramic material is a compound of metallic or metalloid elements bonded with nonmetallic elements or metalloid elements primarily in ionic or covalent bonds. Example ceramic materials may include, but are not limited to, oxides, carbides, nitrides, borides, silicides, and combinations thereof. The coating 80 may be a monolayer coating but more typically will be a multi-layer coating. For instance, the coating 80 has a first coating layer 80a and a second coating layer 80b. In this example, the second coating layer 80b is a topcoat.

The ceramic material of the coating 80 provides thermal and/or environmental resistance. As an example, the ceramic material may include or may be yttria stabilized with zirconia, hafnia, and/or gadolinia, gadolinia zirconate, molybdate, alumina, or combinations thereof.

The bond coat for attaching the ceramic material to the wall 74 may be formed of an alloy. Example alloys may include, but are not limited to, nickel alloys, cobalt alloys, a nickel alloy coated with cobalt or cobalt alloy, or a non-nickel alloys that do not substantially react with ceramic. The bond coat may include a nickel alloy, platinum, gold, silver, or MCrAlY, where the M includes at least one of nickel, cobalt, iron, or combinations thereof.

The cell sidewalls 76a facilitate reducing internal stresses in the coating 80 that may occur from sintering at relatively high surface temperatures during use in the engine 20. The sintering may result in partial melting, densification, and diffusional shrinkage of the coating 80 and thereby induce internal stresses. The cell sidewalls 76a serve to produce faults in the coating 80. The faults provide locations for releasing energy associated with the internal stresses (e.g., reducing shear and radial stresses). That is, the energy associated with the internal stresses may be dissipated in the faults such that there is less energy available for causing delamination cracking between the coating 80 and the underlying wall 74.

The coating section 72 may be formed using several different fabrication techniques. As an example, the wall 74 may be fabricated by investment casting, additive manufacturing, brazing, or combinations thereof, but is not limited to such techniques. For instance, the cells 76 can be separately fabricated and brazed to the remaining portion of the wall 74, which can be investment cast or additively fabricated. Alternatively, the cells 74 can be formed by other techniques, such as depositing an alloy coating and removing sections of the alloy coating by machining, electro-discharge machining (EDM), or other removal process.

To produce the coating 80, ceramic coating material is deposited in the cells 76 of the panel 70. The deposition process can include, but is not limited to, plasma spray or physical vapor deposition. In one example, plasma spray is used to produce a more durable version of the coating 80. For instance, as shown in FIG. 5, the coating 80 has a laminar microstructure 82. The laminar microstructure 82 includes grains 82a of ceramic material that have a high aspect ratio. The laminar microstructure 82 is a product of the plasma spray process, in which droplets of melted or partially melted ceramic material are sprayed onto the cells 76. Upon impact, the droplets flatten and solidify, yielding the laminar microstructure 82. There may be voids or pores among the grains 82a; however, the coating 80 is substantially fully dense. For instance, the coating 80 has a porosity of less than 15%.

The ceramic coating material fills or substantially fills the cells 76 and is deposited in a thickness that may be equal to or greater than the height of the cell sidewalls 76a. At this stage, the surface of the coating may have contours from the underlying cells 76. If such contours are undesired, the surface may be machined, ground, or abraded flat. For instance, the surface is reduced down to or close to the tops of the cell sidewalls 76a.

Figure 6:
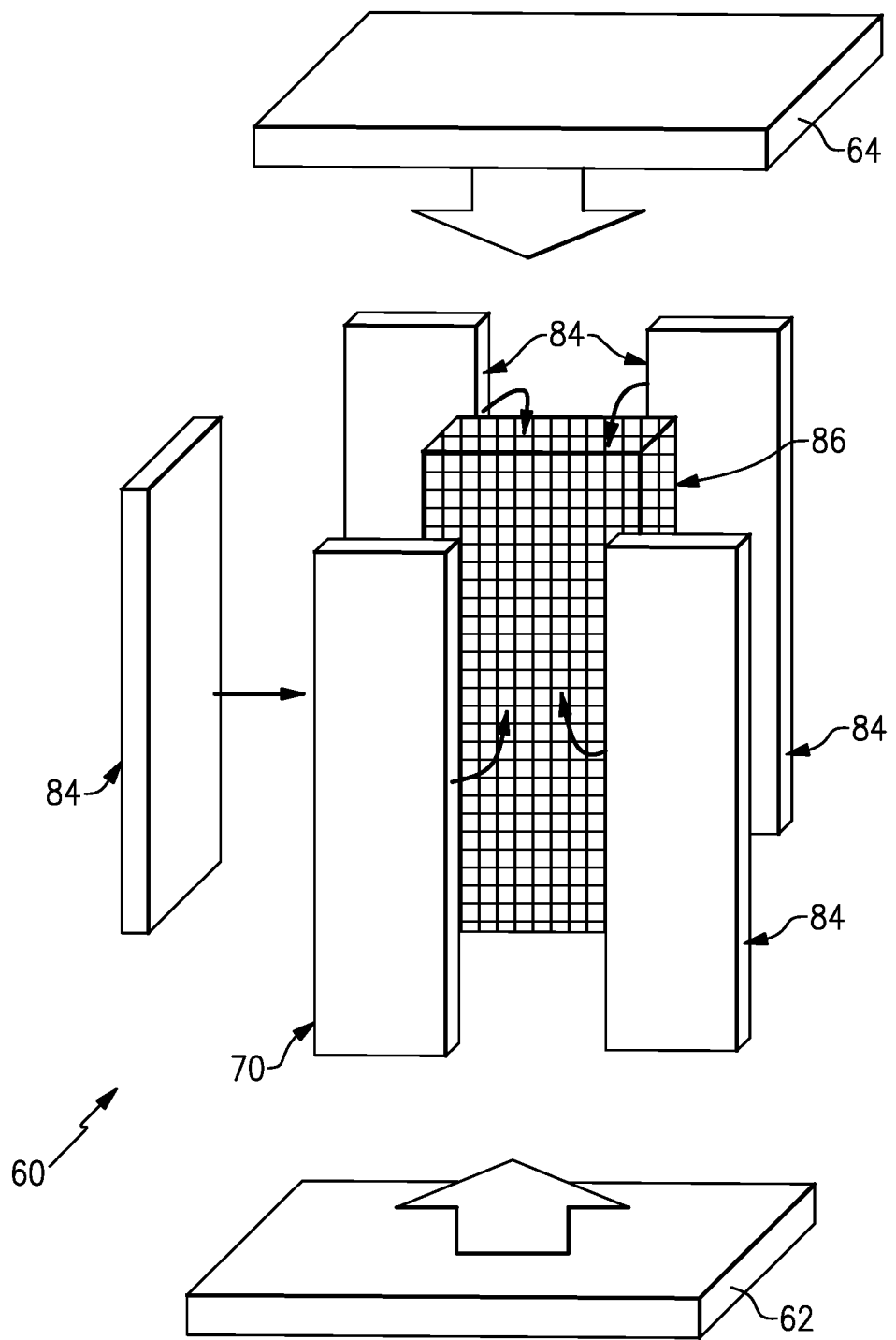
FIG. 6 illustrates an exploded view of an example airfoil having panels and a core skeleton.

FIG. 6 illustrates an exploded view of the airfoil 60, with each of the main components schematically represented. The airfoil 60 includes the panel 70, and one or more compliment panels 84. Each of the compliment panels 84 is a "compliment" in that they also define a portion of the airfoil profile. The panels 70 and 84 are attached with a core skeleton 86, which positions and mechanically supports the panels 70 and 84. The panels 70 and 84 are trapped between the inner and outer platforms 62/64 to form the airfoil 60.

The panels 70 and 84 enable the properties, such as thermal resistance, to be tailored at different locations around the airfoil profile according to the property requirements at each location. For instance, the panel 70 with the coating section 72 may be used at a location on the airfoil profile that is exposed to higher temperature conditions, while a panel 84, which has different properties, may be used at a location that is exposed to lower temperature conditions. In one example, the panel 70 is located on a suction side (SS) of the airfoil section 66. Alternatively or additionally, a panel 70 could also be provided on the pressure side (PS) of the airfoil section 66.

Figure 7:
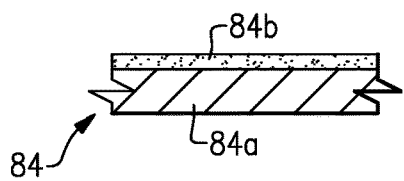
FIG. 7 illustrates a sectioned view of a compliment panel that has a ceramic coating.

As depicted in a representative sectioned view in FIG. 7, the panels 84 may have a different structure from the panel 70, and thus different properties. For example, the panel 84 includes a wall 84a and a coating 84b on an exterior side of the wall 84a. The coating 84b may be the same composition as the coating 80 or alternatively selected from the ceramic materials described above for the coating 80. The wall 84a may be metal, such as a nickel alloy, cobalt alloy, a nickel alloy coated with cobalt or cobalt alloy, or a non-nickel alloy that does not react with the ceramic of the coating 84b. Panel 84 could also be a monolithic ceramic or a ceramic matrix composite material where coating 84b is an environmental barrier coating. The ceramic matrix composite is comprised of a reinforcement phase, such as ceramic or carbon fibers, dispersed in a ceramic matrix formed of oxides, carbides, nitrides, borides, silicides, or combinations thereof. The panel 84 includes the coating 84b but excludes any cells. Rather, the wall 84a is relatively smooth and contains no cells. The panel 84 is thus not geometrically segmented.

Figure 8:
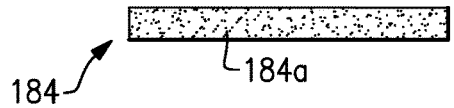
FIG. 8 illustrates a sectioned view of another compliment panel that has a monowall.

FIG. 8 illustrates a representative sectioned view of another example panel 184 that is not geometrically segmented. In this disclosure, like reference numerals designate like elements where appropriate and reference numerals with the addition of one-hundred or multiples thereof designate modified elements that are understood to incorporate the same features and benefits of the corresponding elements. In this example, the panel 184 includes a monowall 184a that is formed only of ceramic material, such as a monolithic ceramic selected from the ceramic materials or ceramic matrix composite described above. The ceramic material in this case may be coated with an environmental barrier coating.

Figure 9:
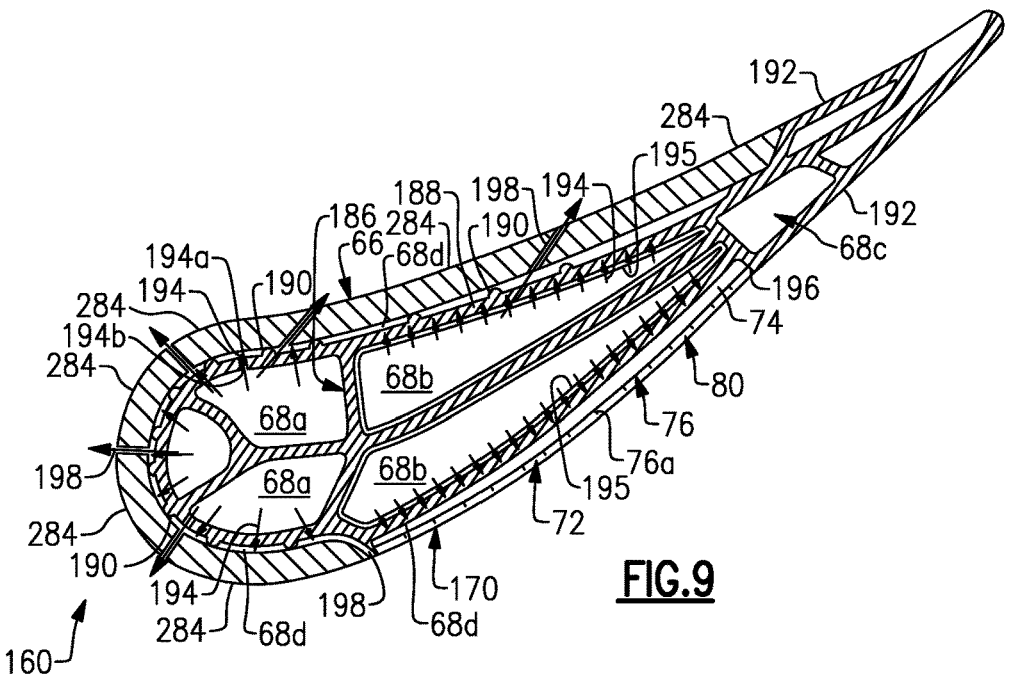
FIG. 9 illustrates a sectioned view of another example airfoil with a panel and geometrically segmented coating.

FIG. 9 illustrates a sectioned view of another example airfoil 160. In this example, the airfoil 160 includes a panel 170 with the coating section 72 as described above and a plurality of compliment panels 284. The panel 170 is on a suction side of the airfoil section 66, but a similar panel 170 could additionally or alternatively be used at other locations of the airfoil profile.

The panels 170/284 are attached with a core skeleton 186. The core skeleton 186 positions and supports the panels 170/284. In this regard, the core skeleton 186 may be formed of a metal alloy for good strength and durability. Example alloys may include, but are not limited to, nickel alloys, cobalt alloys, a nickel alloy coated with cobalt or cobalt alloy, or a non-nickel alloys that do not substantially react with ceramic. The panels 170/284 may be tailored to meet property requirements, such as thermal resistance, at each location around the airfoil profile.

In this example, the core skeleton 186 includes a structural frame 188. The frame 188 defines one or more passages 68a, 68b, and 68c for providing cooling bleed air to one or more of the panels 170/284. In this example, the frame 188 includes three leading end passages 68a, two intermediate passages 68b, and a single trailing end passage 68c. As will be appreciated, the frame 188 may include additional passages or fewer passages, depending on cooling requirements.

The frame 188 generally includes several portions, defined by the different functions served. The forward portion of the frame 188 serves to support and position the panels 170/284, while the aft portion serves to define a portion of the airfoil profile. In these regards, the forward portion of the frame 188 may include spacers 190 and the aft portion of the frame 188 may include exterior wall portions 192 that form a portion of the airfoil profile. The exterior wall portions 192 may be formed of metal alloy, which may be coated with a thermal barrier coating or a geometric segmented coating, such as coating 72. In this regard, the exterior wall portion 192 with the geometric segmented coating may be considered a panel 170 that is integrated with the frame 188.

The spacers 190 offset the panels 170/284 from the core skeleton 186 such that there are passages 68d between the panels 170/284 and the core skeleton 186. In the example shown, the spacers 190 are projections on the frame 188 of the core skeleton 186. For instance, the spacers 190 are integrally formed with the frame 188. Additionally or alternatively, the spacers 190 may be separate pieces from the frame 188 or pieces that are attached onto the frame 188.

The frame 188 also includes cooling holes 194 that serve to feed cooling bleed air into the passages 68d and/or as impingement jets on the inner sides of the panels 170/284. As shown, each cooling hole 194 includes an inlet 194a that opens to one of the passages 68a/68b/68c and an outlet 194b that opens adjacent one of the panels 170/284. There are a series of cooling holes 194 along each of the panels 170/284. Additional or fewer cooling holes 194 may be provided depending on cooling requirements. One or more baffles 195 may also be provided in the passages 68a, 68b, or 68c for distributing cooling bleed air to the cooling holes 194.

The frame 188 may also include one or more recesses 196. For instance, the recess 196 is a geometric compliment to the panel 170. The panel 170 is received into the recess 196, which facilitates securing the panel 170 in its proper position about the airfoil profile. In this example, the recess 196 positions the panel 170 such that the panel 170 is flush with the exterior wall portion 192 of the frame 188. Thus, the airfoil profile is formed, in part, by the panel 170 having the ceramic coating 80 and the metal alloy of the exterior wall portion 192 of the frame 188. The frame 188 may also establish positions of the panels 170/284 such that there are gaps or cooling holes 198 between the panels 170/284. The cooling holes 198 serve as film cooling slots for discharging a film of cooling bleed air from the passages 68d over the outer surfaces of the airfoil section 66. In this regard, the edges of the panels 170/284 may be sloped such that the cooling holes 198 direct the cooling bleed air in an aft direction along the outer surfaces.

The core skeleton 186 and panels 170/284 may be trapped between the inner and outer platforms 62/64 as described above. In this regard, should one the core skeleton 186 or panels 170/284 require replacement, the airfoil 160 can be disassembled, the core skeleton 186 or panel 170/284 can be replaced with a new one, and the airfoil 160 can be reassembled. Accordingly, the core skeleton 196 and panels 170/284 can be produced individually as new parts for an original airfoil or as replacement parts in an existing airfoil.

The use of the core skeleton 186 and panels 170/284 enables each component to be tailored for its specific function. For instance, alloys can be used where high strength but lower thermal resistance is needed, and ceramics can be used where high thermal resistance but less strength is needed.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. An airfoil comprising:
    an airfoil section defining an airfoil profile, the airfoil section including a core skeleton, a distinct panel attached with the core skeleton and forming a portion of the airfoil profile, the distinct panel having a geometrically segmented coating section, the geometrically segmented coating section including
        a wall having an outer side, the outer side including an array of cells, and
        a coating disposed in the array of cells.

2. The airfoil as cited in claim 1, wherein the panel is integral with the core skeleton.

3. The airfoil as recited in claim 1, wherein the core skeleton is metal.

4. The airfoil as recited in claim 1, further comprising compliment panel attached with the core skeleton and defining a different portion of the airfoil profile.

5. The airfoil as recited in claim 4, wherein the compliment panel includes a non-segmented coating section.

6. The airfoil as recited in claim 4, wherein the distinct panel and the compliment panel define a cooling hole there between.

7. The airfoil as recited in claim 4, wherein the compliment panel is ceramic.

8. The airfoil as recited in claim 7, wherein the ceramic is selected from the group consisting of a monolithic ceramic and a ceramic matrix composite.

9. The airfoil as recited in claim 1, further comprising spacers that offset the panel from the core skeleton such that there is a passage between the panel and the core skeleton.

10. The airfoil as recited in claim 9, wherein the spacers are projections on the core skeleton.

11. The airfoil as recited in claim 1, wherein the core skeleton includes an internal passage and a plurality of cooling holes with inlets that open to the internal passage and outlets adjacent the distinct panel.

12. The airfoil as recited in claim 11, wherein the core skeleton includes a baffle in the internal passage.

13. The airfoil as recited in claim 1, wherein the core skeleton includes an exterior wall portion that forms a portion of the airfoil profile.

14. The airfoil as recited in claim 13, wherein the core skeleton includes a recess in which the distinct panel is disposed such that the distinct panel is flush with the exterior wall portion.

15. A gas turbine engine comprising:
    a compressor section;
    a combustor in fluid communication with the compressor section; and
    a turbine section in fluid communication with the combustor,
    at least one of the turbine section or the compressor section including an airfoil having an airfoil section defining an airfoil profile, the airfoil section including a core skeleton, a distinct panel attached with the core skeleton and forming a portion of the airfoil profile, the distinct panel having a geometrically segmented coating section, the geometrically segmented coating section including
        a wall having an outer side, the outer side including an array of cells, and
        a coating disposed in the array of cells.

16. The gas turbine engine as recited in claim 15, further comprising a compliment panel attached with the core skeleton and defining a different portion of the airfoil profile, wherein the compliment panel includes a non-segmented coating section.

17. An article comprising:
    a distinct panel having a geometrically segmented coating section, the geometrically segmented coating section including
        a wall having an array of cells, wherein the array of cells are geometric cells that are closed-sided, and
        a coating disposed in the array of cells.

18. The article as recited in claim 17, wherein the distinct panel defines a portion of an airfoil profile, the wall is metal, and the coating is ceramic.

19. The airfoil as recited in claim 1, wherein the cells are geometric cells.

20. The airfoil as recited in claim 19, wherein the geometric cells are closed-sided cells.

21. The airfoil as recited in claim 20, wherein the closed-sided cells are polygonal cells.

* * * * *